US012612156B2

(12) United States Patent

Ellis et al.

(10) Patent No.: US 12,612,156 B2

(45) Date of Patent: Apr. 28, 2026

(54) MAGNETIC WEIGHT ON WHEELS DETECTION

(71) Applicants: SAFRAN LANDING SYSTEMS, Velizy-Villacoublay (FR); SAFRAN LANDING SYSTEMS CANADA INC., Ajax (CA)

(72) Inventors: Andrew Michael Ellis, Guelph (CA); Keyur Mistry, Velizy-Villacoublay (FR); Graeme Peter Arthur Klim, Velizy-Villacoublay (FR); Duy-Minh Nguyen, Velizy-Villacoublay (FR)

(73) Assignees: Safran Landing Systems, Velizy-Villacoublay (FR); Safran Landing Systems Canada Inc., Ajax (CA)

( * ) Notice: Subject to any disclaimer, the term of this patent is extended or adjusted under 35 U.S.C. 154(b) by 13 days.

(21) Appl. No.: 18/180,723

(22) Filed: Mar. 8, 2023

(65) Prior Publication Data

US 2024/0300638 A1 Sep. 12, 2024

(51) Int. Cl.
B64C 25/00 (2006.01)
B64C 25/58 (2006.01)
G01L 5/00 (2006.01)

(52) U.S. Cl.
CPC ............ B64C 25/001 (2013.01); B64C 25/58 (2013.01); G01L 5/0014 (2013.01)

(58) Field of Classification Search
CPC ..... B64C 25/001; B64C 25/58; G01L 5/0014; G01L 5/0023; F16F 9/3292; B60G 2400/252; B60G 2300/16; B60G 2401/17; B60G 2401/172
See application file for complete search history.

(56) References Cited

U.S. PATENT DOCUMENTS

| | | | | |
|---|---|---|---|---|
| 6,552,532 B1 * | 4/2003 | Sako | ...................... | G01D 5/145 |
| | | | | 324/207.2 |
| 8,659,307 B2 | 2/2014 | Eriksen et al. | | |
| 8,933,713 B2 | 1/2015 | Eriksen et al. | | |
| 9,816,217 B2 | 11/2017 | Ius et al. | | |
| 2004/0222788 A1 * | 11/2004 | Low | .................... | F15B 15/2846 |
| | | | | 341/15 |
| 2016/0298714 A1 * | 10/2016 | Schmidt | ................. | F16J 15/403 |

(Continued)

FOREIGN PATENT DOCUMENTS

| | | | | |
|---|---|---|---|---|
| CA | 3 124 456 A1 | 1/2022 | | |
| DE | 4327047 A1 * | 2/1995 | ............. | G01B 7/003 |
| DE | 10 2021 130 656 A1 | 5/2022 | | |

(Continued)

OTHER PUBLICATIONS

International Search Report and Written Opinion mailed May 29, 2024, issued in corresponding International Application No. PCT/EP2024/054750, filed Feb. 26, 2024, 13 pages.

*Primary Examiner* — Joshua D Huson
(74) *Attorney, Agent, or Firm* — Christensen O'Connor Johnson Kindness PLLC

(57) ABSTRACT

A shock absorber for a vehicle includes a cylinder and a piston, a portion of which slidably disposed with the cylinder. A magnetic target is fixedly positioned relative to the piston, and a sensor is fixedly positioned relative to the cylinder. The sensor generates a signal according to the position of the magnet target relative to the sensor.

3 Claims, 10 Drawing Sheets

(56) References Cited

U.S. PATENT DOCUMENTS

2020/0324920 A1 * 10/2020 Fazeli ....................... B64F 5/60

FOREIGN PATENT DOCUMENTS

| DE | 10 2022 109 015 A1 | 10/2023 | |
|---|---|---|---|
| EP | 1 964 696 A2 | 9/2008 | |
| EP | 2 818 405 A1 | 12/2014 | |
| GB | 2096421 A * | 10/1982 | .......... F15B 15/2846 |
| WO | WO-2004005748 A1 * | 1/2004 | ....... B60G 17/01933 |

* cited by examiner

Figure 4:
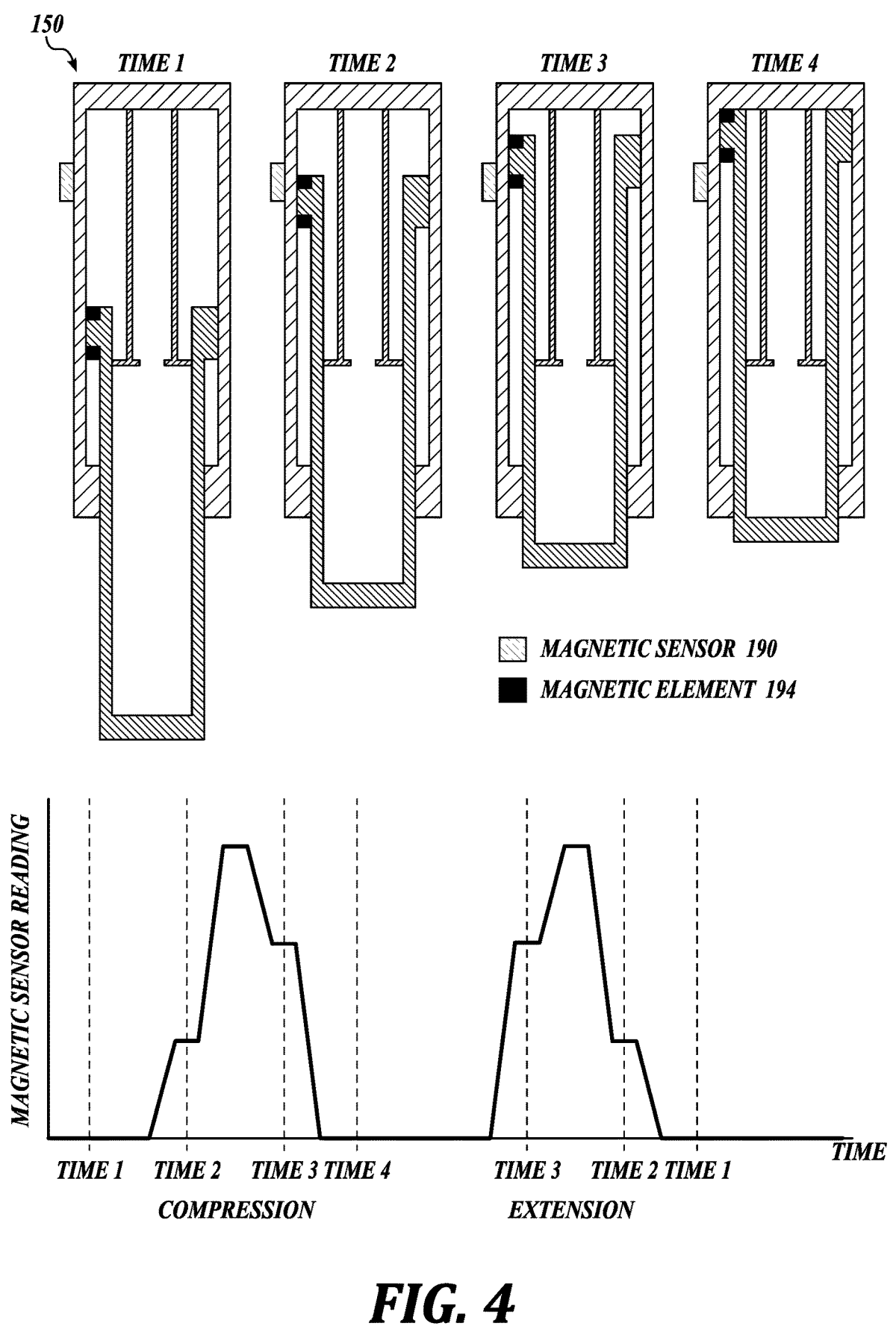

150

TIME 1      TIME 2      TIME 3      TIME 4

MAGNETIC SENSOR  190

MAGNETIC ELEMENT  194

MAGNETIC SENSOR READING

TIME

TIME 1      TIME 2      TIME 3 TIME 4          TIME 3      TIME 2 TIME 1

COMPRESSION          EXTENSION

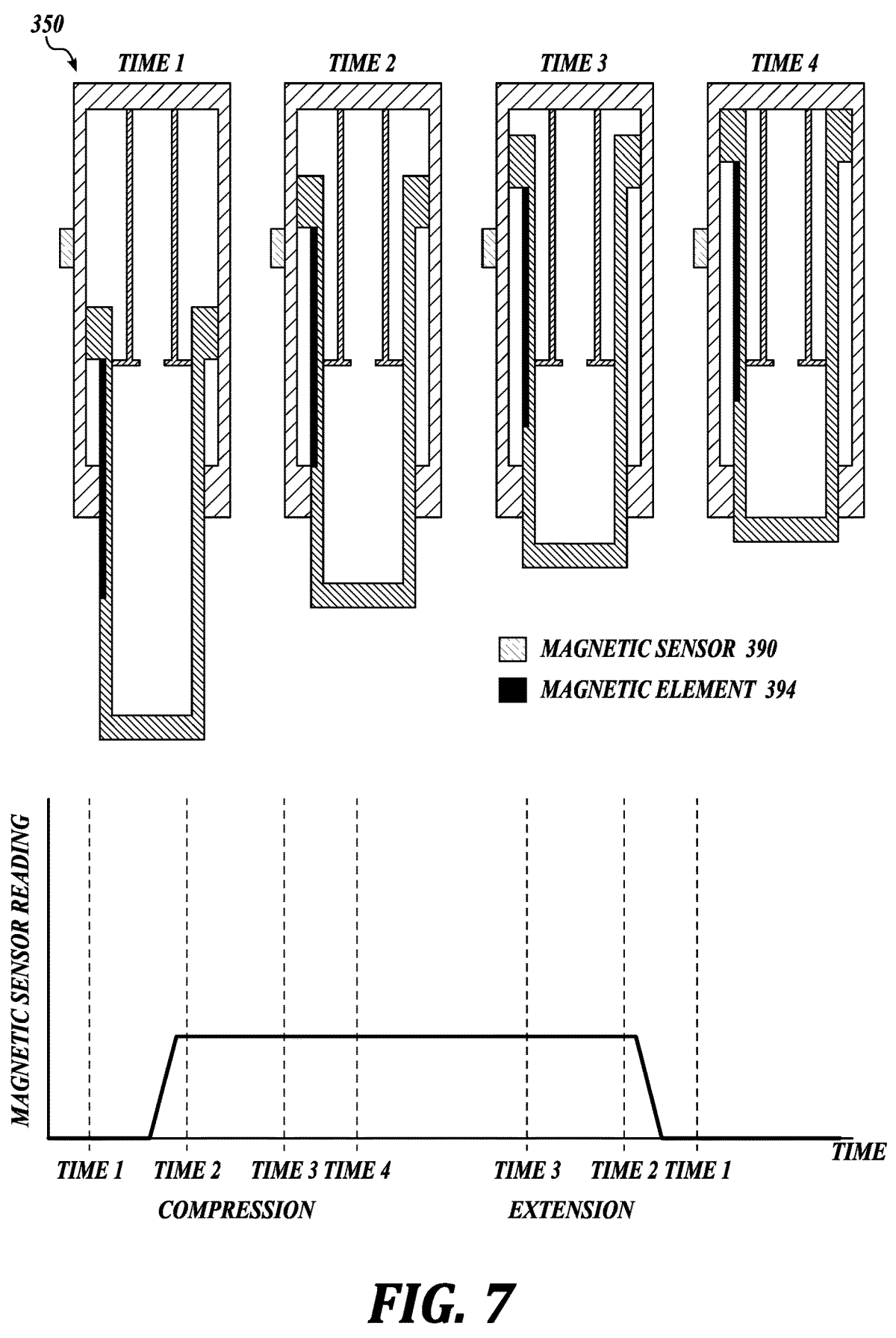

TIME 1          TIME 2          TIME 3          TIME 4

▨ MAGNETIC SENSOR  390

■ MAGNETIC ELEMENT  394

MAGNETIC SENSOR READING

TIME

TIME 1      TIME 2      TIME 3 TIME 4          TIME 3      TIME 2 TIME 1

COMPRESSION          EXTENSION

FIG. 7

MAGNETIC WEIGHT ON WHEELS DETECTION

BACKGROUND

Vehicles with takeoff and landing functionality, such as aircraft, maglev vehicles, helicopters, urban air mobility vertical take-off and landing (VTOL) vehicles, etc., often have landing gear systems that reciprocate between an extended position and a retracted position. When the vehicle is not airborne or levitated, the landing gear system is extended and in contact with the ground (or other support surface) to support the vehicle. When the vehicle is airborne or otherwise levitated, the landing gear system retracts to reduce drag and prevent damage to the landing gear system that may occur at high-speed travel.

FIG. 1 shows an embodiment of a known landing gear assembly 20 suitable for use with various aircraft and maglev vehicles. The landing gear 20 is disclosed in U.S. Pat. No. 10,549,848 ("Klim et al."), which is currently assigned to Safran Landing Systems Canada Inc., the disclosure of which is expressly incorporated herein. The landing gear 20 utilizes an oleo-pneumatic shock absorber 22 that cushions impact during takeoff, landing, and taxiing, while also damping vertical oscillations.

The shock absorber 22 includes a piston 26 slidingly engaged with a cylinder 24. Movement of the piston 26 relative to the cylinder 24 provides reactive spring forces to counter impact loads on the landing gear 20. The movement of the piston 26 relative to the cylinder 24 also drives fluid through internal orifices to provide damping forces that dissipate the kinetic energy of the impact loads.

A wheel assembly 34 is coupled to the piston 26 and includes an axle 38 with one or more wheels 36 rotatably mounted thereto. The piston 26 is mounted to a housing 30 that is itself mounted to the vehicle. External threads on the cylinder 24 threadedly engage a drive nut (not shown) rotatably mounted within the housing 30.

A drive assembly 28 includes a motor 32 mounted to the housing 30 and configured to selectively rotate the drive nut about a longitudinal axis. Selective rotation of the drive nut within the housing drives reciprocating translation of a cylinder 24. As the cylinder 24 reciprocates along a central axis, the wheel assembly 34, which is coupled to the cylinder 24, reciprocates between the raised and lowered positions. That is, the drive assembly translates the shock absorber 22 relative to the housing 30 to extend and retract the landing gear assembly 20.

In aerospace and/or maglev applications, it is advantageous to be able to detect a Weight on Wheels (WoW) condition, which occurs when the wheels are in contact with the ground, and the vehicle is fully supported by the wheels. For example, a detected WoW condition is utilized in various methods for stable extension of landing gear systems disclosed in U.S. Patent Publication No. 2022/0024566, ("Toufflemire et al."), which is currently assigned to Safran Landing Systems and Safran Landing Systems Canada Inc., the disclosure of which is expressly incorporated herein.

Conventional WoW detection systems are typically binary, i.e., true or false. Such systems do not provide for the measurement of multiple different states. In some applications, it can also be desirable to sense other landing gear states, such as Wheels-on-Ground (WoG). In a WoG state, e.g., at touchdown, the wheels are in contact with the ground, but the vehicle has enough lift/levitation that the weight of the vehicle is not supported by the wheels. It may further be desirable to detect the degree to which the landing gear shock absorbers are extended or compressed during takeoff, landing, and taxiing maneuvers. For example, it may be useful to continuously monitor the stroke of the shock absorbers to detect malfunctions, provide information regarding required maintenance, and/or provide active stability functionality. These and other landing gear states can be useful to control the deployment speeds of individual landing gear assemblies, provide improved stability, detect malfunctions, etc.

SUMMARY

The subject matter disclosed herein provides systems for sensing and/or monitoring the compression of one or more shock absorbers of a landing gear system. In an embodiment, a shock absorber for a vehicle includes a cylinder and a piston, a portion of which slidably disposed with the cylinder. A magnetic target is fixedly positioned relative to the piston, and a sensor is fixedly positioned relative to the cylinder. The sensor generates a signal according to the position of the magnet target relative to the sensor.

In any embodiment, the shock absorber further comprises a controller in operable communication with the sensor, the controller being programmed to determine a position of the piston relative to the cylinder according to the signal generated by the sensor.

In any embodiment, the controller is programmed to determine a Weight on Wheels condition according to the position of the piston relative to the cylinder.

In any embodiment, the magnetic target comprises first and second magnetic elements spaced apart from each other in a longitudinal direction, the first magnetic element being positioned above the second magnetic element.

In any embodiment, the first magnetic element has a weaker magnetic field than the second magnetic element.

In any embodiment, a magnetic field density of the magnet target varies along a longitudinal direction.

In any embodiment, the magnetic target comprises 3 or more magnetic elements mounted to the piston and are spaced apart from each other in a longitudinal direction.

In any embodiment, the magnetic target comprises magnetic plating applied to at least a portion of the piston.

In any embodiment, the magnetic target comprises a magnetic portion of the piston.

In any embodiment, the shock absorber further comprises one or more additional sensors fixedly positioned relative to the cylinder, wherein each sensor generates a signal according to the position of the magnet target relative to the sensor.

In any embodiment, each of the additional sensors is in operable communication with the sensor, the controller being programed to determine a position of the piston relative to the cylinder according to the signals generated by the additional sensors.

In any embodiment, the magnetic target comprises first and second magnetic elements spaced apart from each other in a longitudinal direction, the first magnetic element being positioned above the second magnetic element.

In any embodiment, the first magnetic element has a weaker magnetic field than the second magnetic element.

In any embodiment, the magnetic target comprises a magnetized portion of the piston having a tapered thickness.

In any embodiment, the shock absorber further comprising an inner shell fixedly associated with the magnetized portion of the piston having a tapered thickness, the inner shell having a cylindrical surface in sealing engagement with a portion of the cylinder.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 shows the shock absorber of FIG. 3 in different states of extension/compression and corresponding sensor readings for each state;

FIG. 7 shows the shock absorber of FIG. 6 in different states of extension/compression and corresponding sensor readings for each state;

DETAILED DESCRIPTION

The detailed description set forth herein in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of a shock absorber suitable for landing gear assemblies and the like, wherein the shock absorber is configured to provide information regarding the position of the shock absorber piston relative to the cylinder, i.e., the compression and extension of the shock absorber. This information, in turn, can be used to determine various states of the landing gear and aircraft in general that correspond to different shock absorber states.

Figure 1:
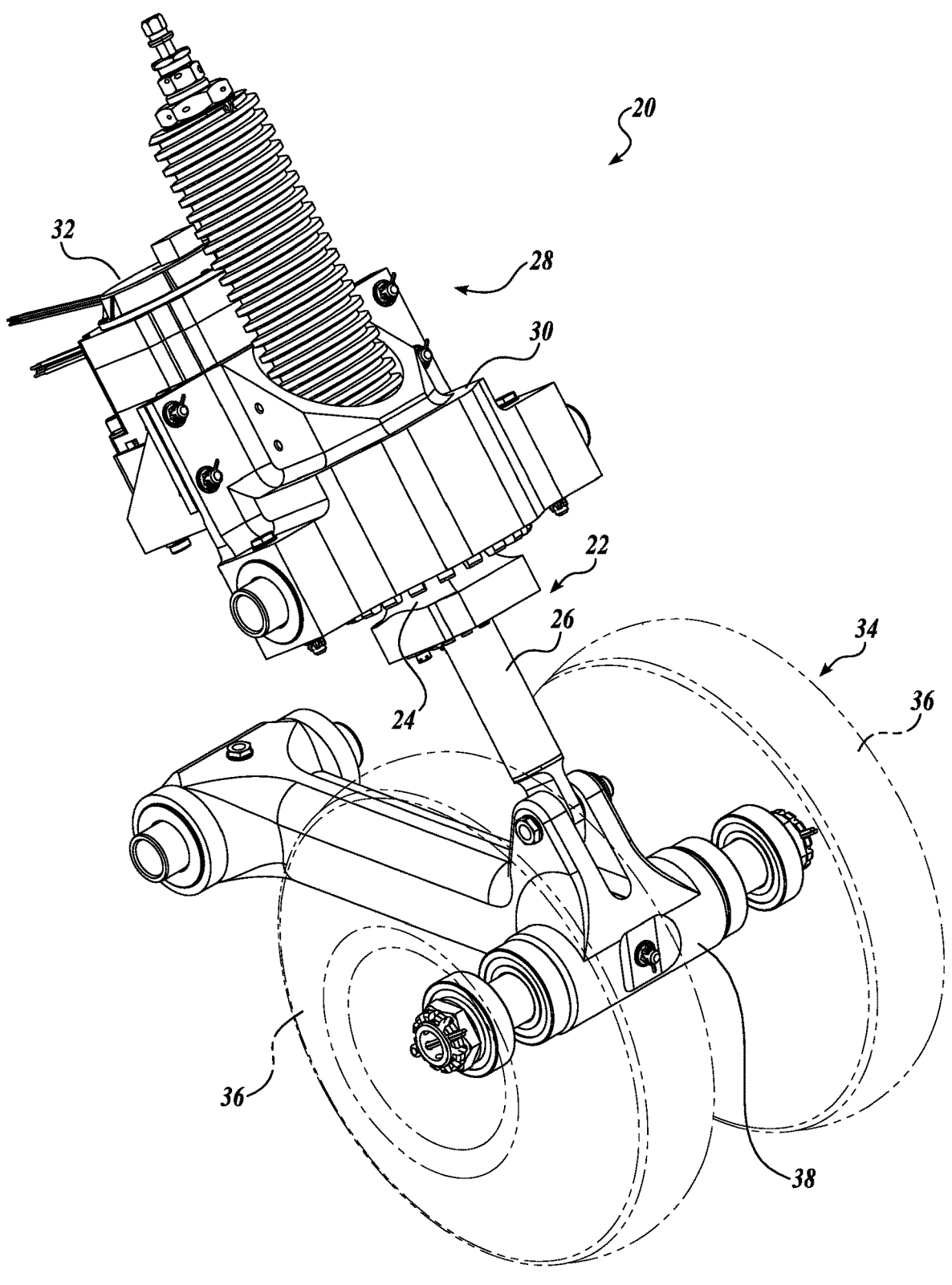
FIG. 1 shows an isometric view of a known landing gear assembly.
Figure 2:
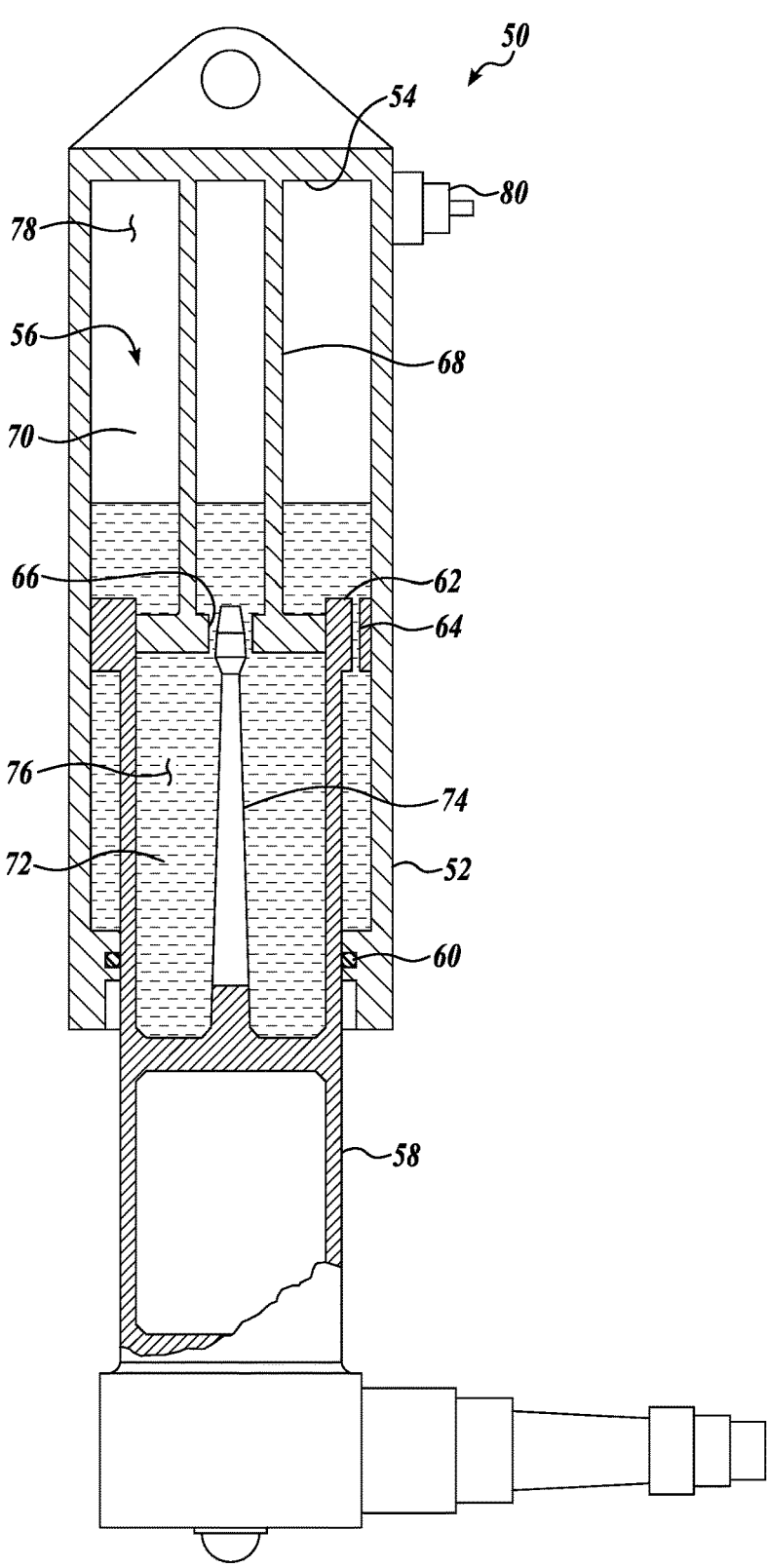
FIG. 2 shows a cross-sectional view of a known shock absorber.

FIG. 2 shows a cross-sectional side view of a known oleo-pneumatic shock absorber 50 typical of the type used as a shock strut for aircraft landing gear assemblies. The shock absorber 50 is disclosed in U.S. Patent Application Publication No. 2016/0327114, by Schmidt, which is assigned to Safran Landing Systems UK Ltd., the disclosure of which is incorporated by reference in its entirety herein.

The shock absorber 50 includes an inner housing portion 58, which acts as a piston, slidably coupled within an outer housing portion 52, which acts as a cylinder. More specifically, the inner housing portion 58 is slidably mounted to the outer housing portion 52 by one or more bearings 62 with at least one orifice 64 extending therethrough. The housing portions 52 and 58 are sealingly engaged by a seal 60 and cooperate to define a cavity 56 having an upper chamber 70 and a lower chamber 72. The lower chamber 72 contains a fluid 76, such as oil, and the upper chamber 70 is at least partially filled with a gas 78, such as air. An orifice support tube 68 extends from an end wall 54 of the upper chamber 70 and fixedly positions an orifice 66 extending between the upper chamber 70 and the lower chamber. A metering pin 74 is fixedly secured to the inner housing portion 58 and extends through the orifice 66 to selectively limit the flow of the fluid 76 through the orifice. A valve 80 is mounted to the outer housing portion 52. The valve 80 provides selective fluid communication with the cavity 56 to enable addition or purging of fluid 76 and/or gas 78 into the cavity as needed during initial assembly and/or to provide and maintain desired performance characteristics of the shock absorber 50 in service.

In operation, the shock absorber 50 acts as a damped spring. When a load is applied to the shock absorber 50, such as when an aircraft Weight on Wheels condition is achieved upon landing, the inner housing portion 58 slides further into the outer housing portion 52. As the inner housing portion 58 moves into the outer housing portion, the volume of the cavity 56 is reduced, and the gas 78 inside the cavity is compressed to provide a resistive spring force. When the shock absorber 50 is fully compressed, the loads on the shock absorber are supported by the compressed gas 78. When load is removed from the shock absorber 50, such as following take off, the pressure of the compressed gas 78 drives the inner housing portion 58 out of the outer housing portion 52 so that the shock absorber 50 extends to assume its uncompressed length. As the shock absorber 50 compresses and extends, the fluid 76 is forced through the orifice 66 to provide viscous damping to the spring characteristics provided by the compressed gas 78.

Figure 3:
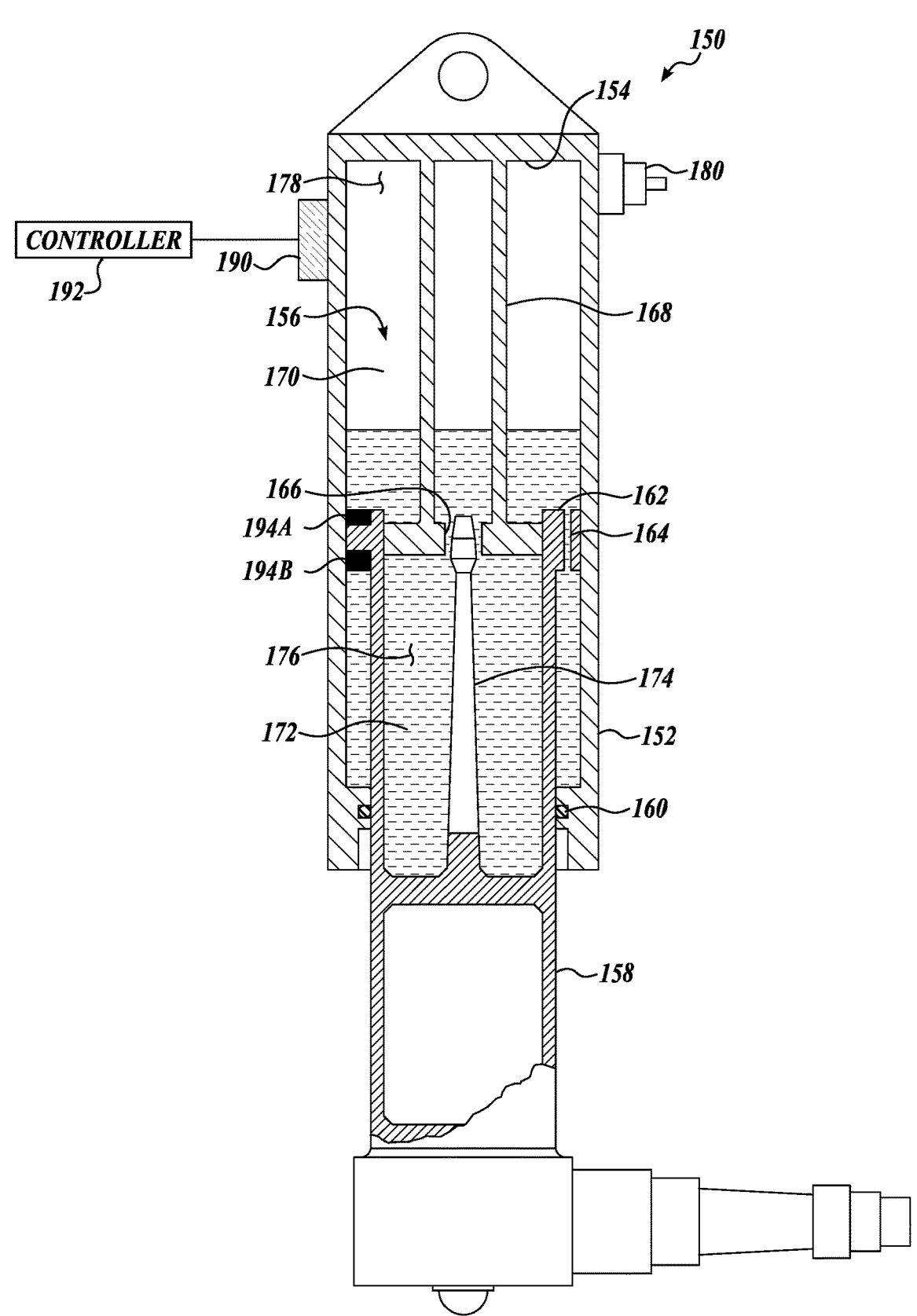
FIG. 3 shows a cross-sectional view of a shock absorber in accordance with an embodiment of the present disclosure.

Referring now to FIG. 3, an embodiment of a shock absorber 150 in accordance with aspects of the present disclosure is shown. The shock absorber 150 is similar to the shock absorber 50 shown in FIG. 2, except as described below. For the sake of brevity, similar features and characteristics will not be described again with the understanding that features of the shock absorber 150 identified by reference number 1XX correspond to similar features shock absorber 50 identified with reference number XX unless otherwise noted. For example, outer housing portion 152 and metering pin 174 shown in FIG. 3 correspond to outer housing portion 52 and metering pin 74, respectively, shown in FIG. 2, unless otherwise noted.

The shock absorber 150 includes one or more magnetic elements (targets 194) fixedly positioned relative to the inner housing portion 158, i.e., the "piston" of the shock absorber 150. That is, when the shock absorber 150 extends and retracts, the one or more targets 194 move relative to the outer housing portion 152, i.e., the cylinder, relative to the inner housing portion 158. In the illustrated embodiment, the shock absorber 150 includes an upper target 194A and a lower target 194B (collectively "targets 194") mounted to the upper and lower portions, respectively, of the bearing 162. In any embodiment, a single target 194 is mounted to the bearing 162 or any suitable part of the inner housing portion 158 or any structure that moves with the inner housing portion as the shock absorber 150 extends and retracts. In any embodiment, the number, shape, size, and position of the targets 194 can vary, and such variations should be considered within the scope of the present disclosure.

A magnetic sensor 190 is fixedly positioned relative to the outer housing portion 152, i.e., the "cylinder" of the shock absorber 150. In any embodiment, the sensor 190 is a Hall effect sensor. In any embodiment, the sensor 190 is any suitable magnetic sensor that generates an output signal that is a function of (varies according to) the magnetic field density around the sensor. In any embodiment, the output signal increases in response to an increased magnetic field density at the sensor 190. In any embodiment, the sensor 190 is mounted to any suitable structure that maintains a fixed position relative to the outer housing portion.

A controller 192, such as a control unit or control circuit, is in operative communication with the sensor 190 and is configured to receive signals from the sensor 190 corresponding to magnetic field density around the sensor 190. In some embodiments, the controller 192 includes a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

In some embodiments, the processor of the controller 192 executes instructions stored in memory. These instructions may include, for example, a set of algorithms, including resident program instructions stored in one of the storage mediums and executed to provide desired functions. In some embodiments, the set of instructions, when executed by the processor, is configured to carry out the functionality of the controller 192 described above. In this regard, the processor and/or memory storage program instructions form a special purposed controller or control circuit specifically configured to carry out the methodologies and technologies described herein.

Based on the signal received from the sensor 190, the controller 192 determines the position of outer housing portion 152 relative to the inner housing portion 158. Further, as the shock absorber 150 extends and retracts, the position of outer housing portion 152 relative to the inner housing portion 158 changes, and the signal generated by the sensor 190 changes. Accordingly, the target 194, sensor 190, and controller 192 cooperate to track the extension and compression of the shock absorber 150.

FIG. 4 shows a time profile, i.e., a graph of the magnetic sensor reading of the shock absorber 150 of FIG. 3, wherein the upper target 194A creates a weaker magnetic field than the lower target 194B. More specifically, the graph shows the sensor readings (signals) for compression (WoW=true) and extension (WoW=false). In some embodiments, the upper target 194A has magnetic field stronger or equal to the magnetic field of the lower target 194B. The detection and processing of these sensor signals indicate if the WoW condition has been reached.

As the shock absorber begins to compress, the magnetic target 194 moves toward the sensor 190, and the magnetic sensor reading (signal) increases. The sensor reading continues to increase until at a time between time 2 and time 3, the target 194 passes the sensor 190. With the target 194 having passed the sensor 190, continued compression of the shock absorber 150 moves the target farther from the sensor, thereby decreasing the sensor reading. When the shock absorber 150 extends from the compressed state back to the extended state, the travel of the target 194 relative to the sensor 190 is reversed so that sensor reading profile during extension is a mirror image of the sensor reading profile during compression.

Figure 5:
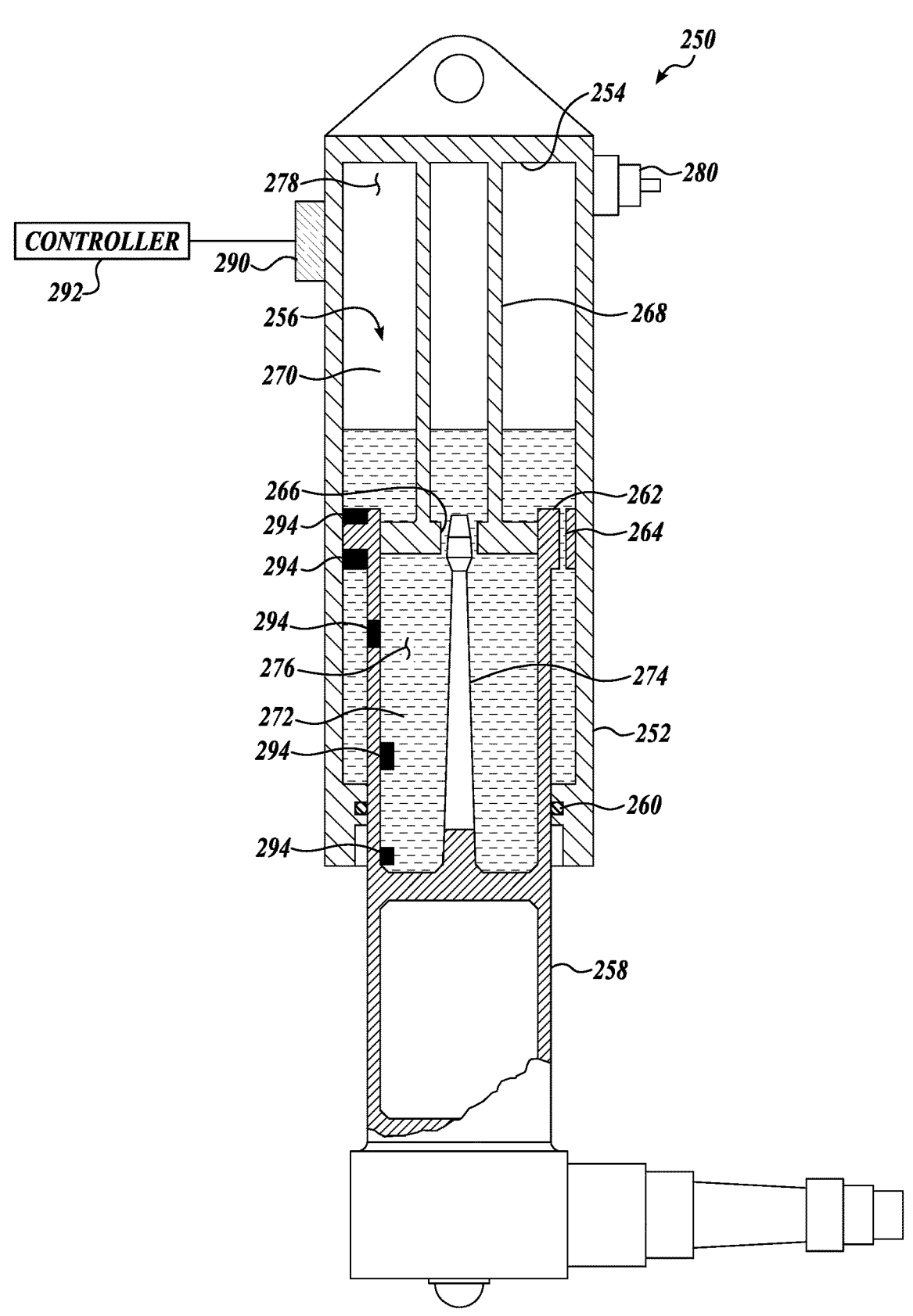
FIG. 5 shows a cross-sectional view of a shock absorber in accordance with another embodiment of the present disclosure.

FIG. 5 shows another embodiment of shock absorber 250 in accordance with aspects of the present disclosure. The shock absorber 250 is similar to the shock absorber 150 shown in FIG. 3, except as described below. For the sake of brevity, similar features and characteristics will not be described again with the understanding that features of the shock absorber 250 identified by reference number 2XX correspond to similar features of shock absorber 150 identified with reference number 1XX unless otherwise noted. For example, outer housing portion 252 and metering pin 274 shown in FIG. 5 correspond to outer housing portion 152 and metering pin 174, respectively, shown in FIG. 3, unless otherwise noted.

The shock absorber 250 includes a plurality of magnetic targets 294 disposed along at least a portion of inner housing portion 258. By varying the number, strength, and location of the magnetic targets 294, the size, shape, and intensity of the magnetic field density can be customized to provide particular sensors reading as the shock absorber 250 extends and contracts. For example, by positioning targets 294 at multiple key locations, shock absorber states such as static stroke, a point near the initial breakout, a point near max stroke, etc., can be detected.

Figure 6:
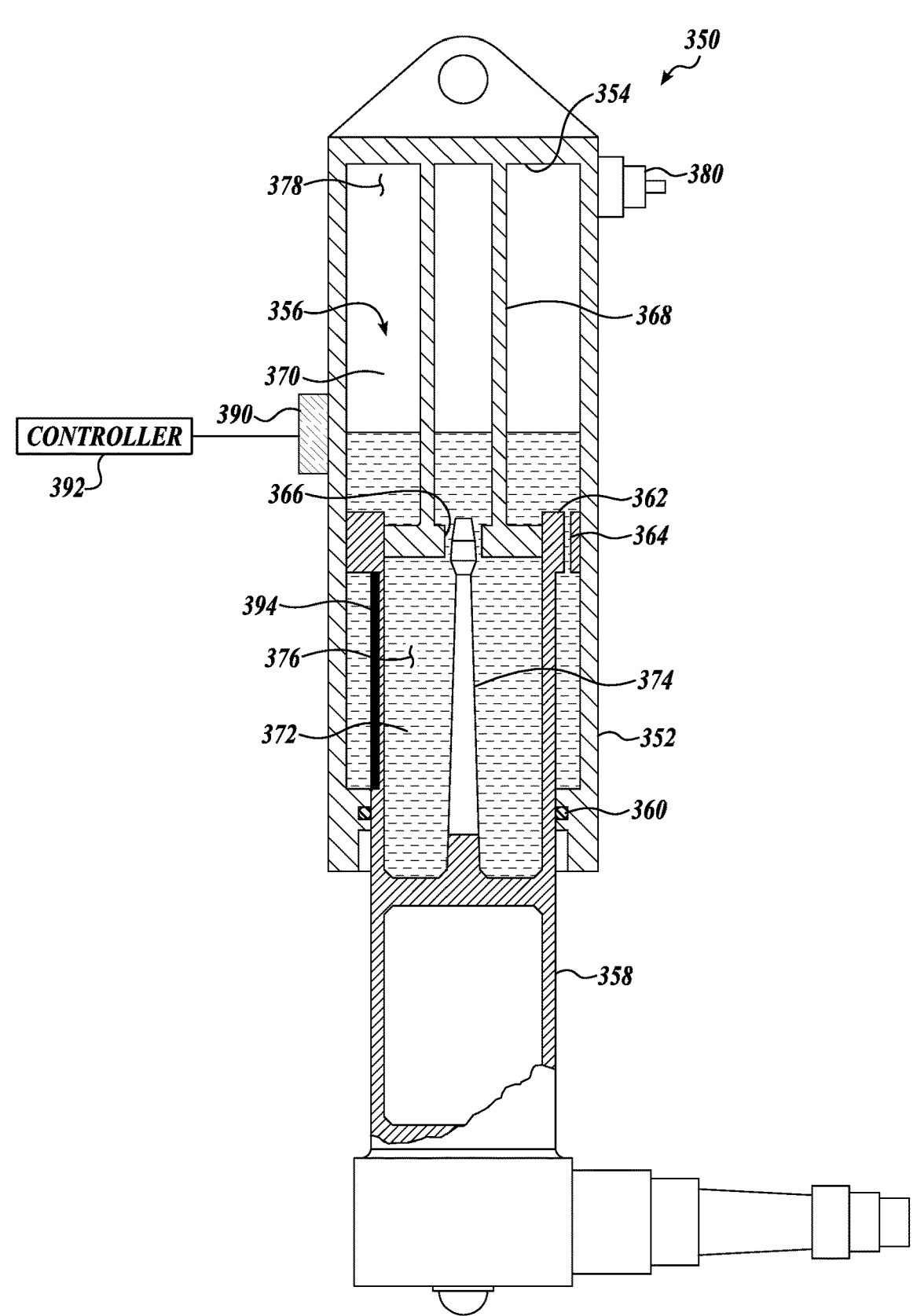
FIG. 6 shows a cross-sectional view of a shock absorber in accordance with another embodiment of the present disclosure.

FIG. 6 shows another embodiment of shock absorber 350 in accordance with aspects of the present disclosure. The shock absorber 350 is similar to the shock absorber 150 shown in FIG. 3, except as described below. For the sake of brevity, similar features and characteristics will not be described again with the understanding that features of the shock absorber 350 identified by reference number 3XX correspond to similar features of shock absorber 150 identified with reference number 1XX unless otherwise noted. For example, outer housing portion 352 and metering pin 374 shown in FIG. 6 correspond to outer housing portion 152 and metering pin 174, respectively, shown in FIG. 3, unless otherwise noted.

In an embodiment, the target 394 is magnetic plating mounted to or integral with the inner housing portion 358. In an embodiment, the plating has a constant magnetic field strength across its length. In an embodiment, the plating has a variable magnetic field strength. As shown in the time profile of FIG. 7, the shock absorber 350 provides a distinct WoW signal rather than a trigger that must be processed. As a result, the shock absorber 350 is more tolerant to system resets.

Figure 8:
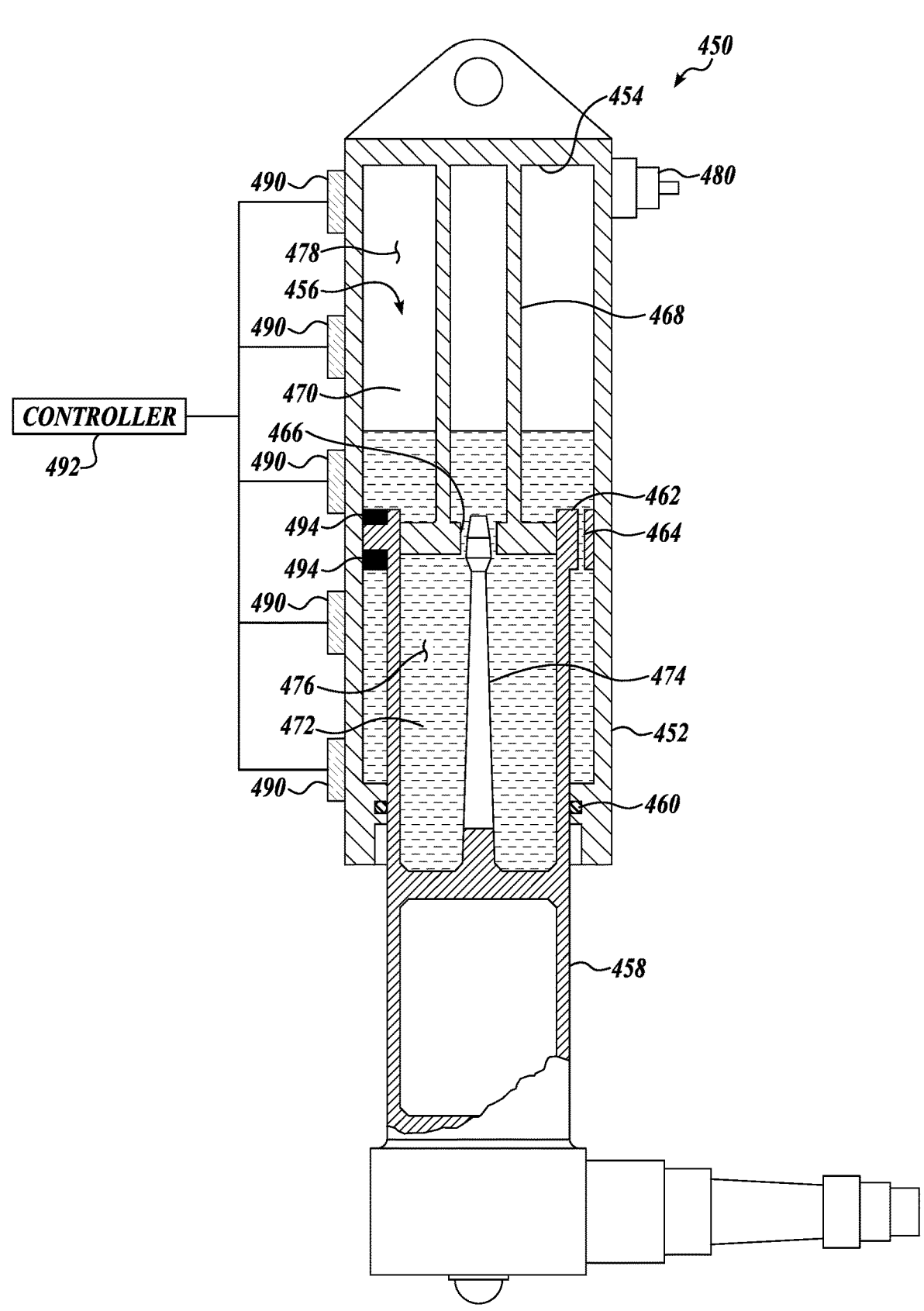
FIG. 8 shows a cross-sectional view of a shock absorber in accordance with another embodiment of the present disclosure.

FIG. 8 shows another embodiment of shock absorber 450 in accordance with aspects of the present disclosure. The shock absorber 450 is similar to the shock absorber 150 shown in FIG. 3, except as described below. For the sake of brevity, similar features and characteristics will not be described again with the understanding that features of the shock absorber 450 identified by reference number 4XX correspond to similar features of shock absorber 150 identified with reference number 1XX unless otherwise noted. For example, outer housing portion 452 and metering pin 474 shown in FIG. 8 correspond to outer housing portion 152 and metering pin 174, respectively, shown in FIG. 3, unless otherwise noted.

The shock absorber has magnetic targets 494 sized and positioned similar to the magnetic targets 194A and 194B of the shock absorber 150 of FIG. 3. A plurality of sensors 490 are disposed along the outer housing portion 452. Each of the plurality of sensors 490 is in operative communication with the controller 492. The controller 492 receives signals from each of the sensors 490 and determines the position of the inner housing portion 458 relative to the outer housing portion 452 according to the sensor readings at a plurality of locations.

Figure 9:
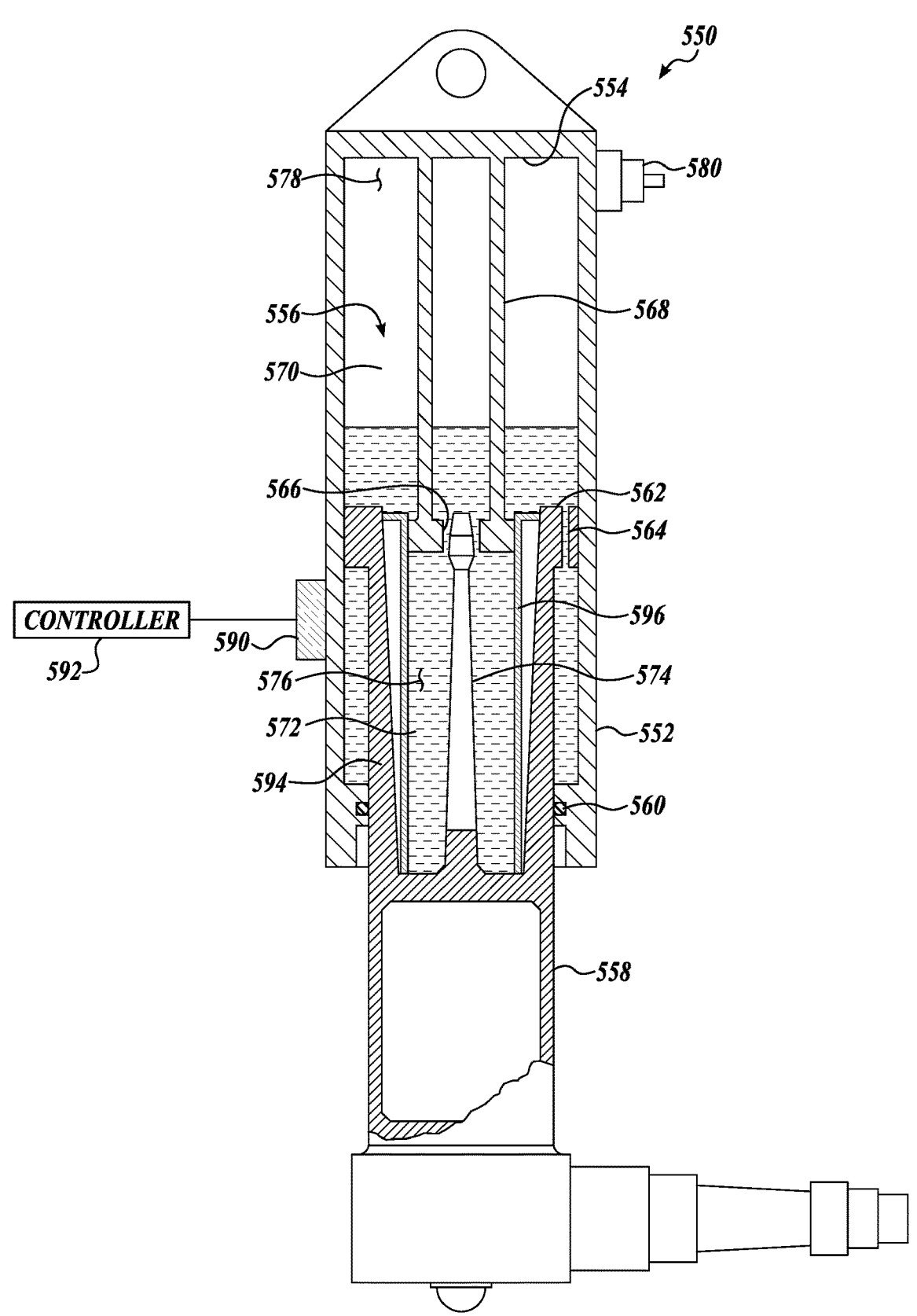
FIG. 9 shows a cross-sectional view of a shock absorber in accordance with another embodiment of the present disclosure.

FIG. 9 shows another embodiment of shock absorber 550 in accordance with aspects of the present disclosure. The shock absorber 550 is similar to the shock absorber 150 shown in FIG. 3, except as described below. For the sake of brevity, similar features and characteristics will not be described again with the understanding that features of the shock absorber 550 identified by reference number 5XX correspond to similar features of shock absorber 150 identified with reference number 1XX unless otherwise noted. For example, outer housing portion 552 and metering pin 574 shown in FIG. 9 correspond to outer housing portion 152 and metering pin 174, respectively, shown in FIG. 3, unless otherwise noted.

A portion of the inner housing portion 558 is magnetized and functions as the target 594. The thickness of the inner housing portion 550 is tapered, resulting in a variable magnetic field density along the length of the inner housing portion 550. An inner shell 596 is mounted to the inner housing portion 558 and provides a cylindrical inner surface to maintain sealing engagement of the support tube 568 of the outer housing portion 552. That is, the inner shell 596 and the tapered inner housing portion 558 cooperate to provide sealing surfaces between the support tube 568 of the outer housing portion 552 similar to those of previously described inner housing portions with walls of constant thickness.

Figures 10A, 10B, 10C:
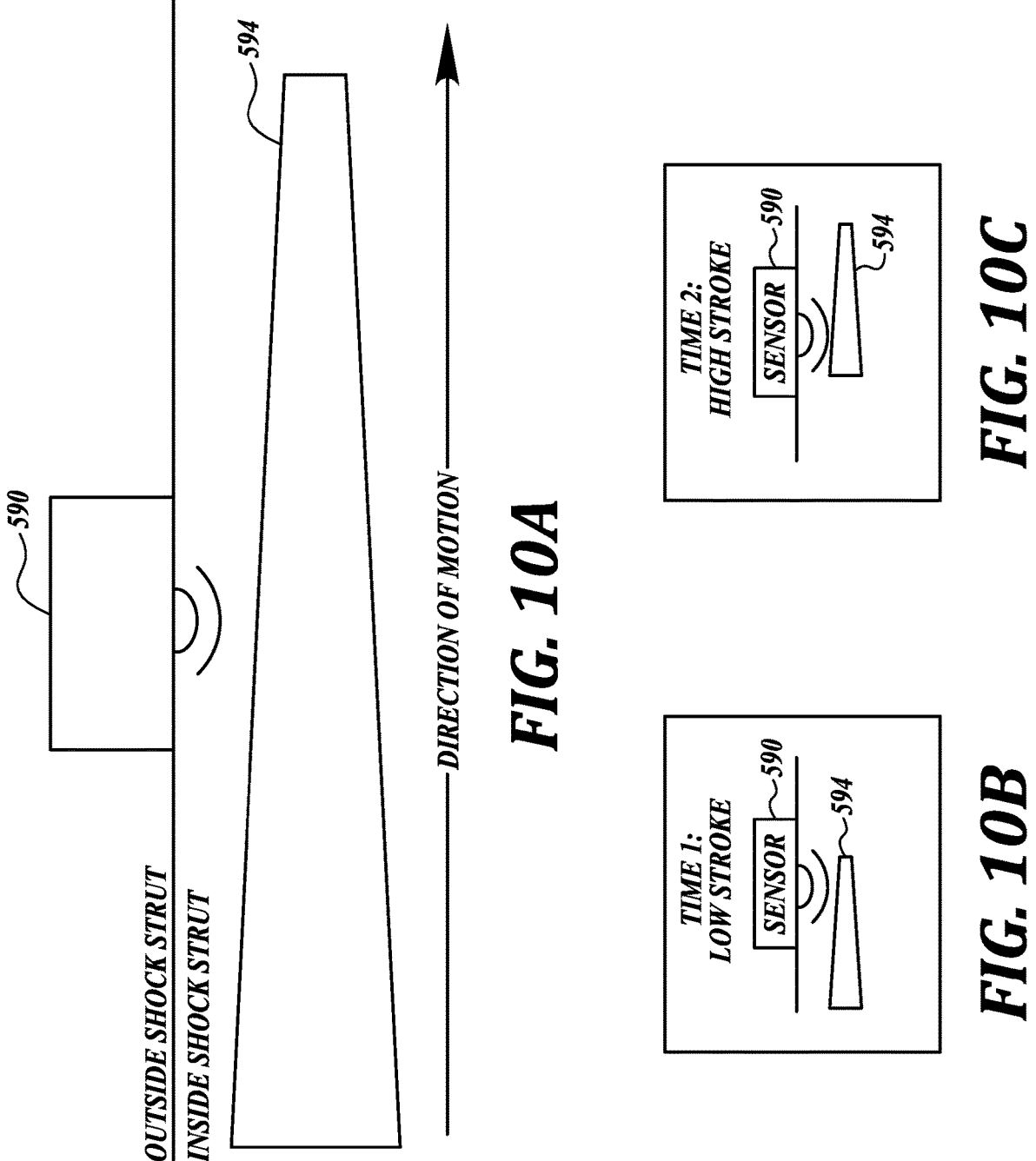
FIGS. 10A-10C show a schematic view of the shock absorber of FIG. 9 in different states.

Referring to FIGS. 10A-10C, because of the variable magnetic density of the target 594 (tapered inner housing portion 550), the signal generated by the sensor 590 directly correlates to the thickens of the target 594 proximate to the sensor and, therefore, the position of the inner housing portion relative to the outer housing portion. More specifically, the state of the shock absorber within the shock absorber stroke can be determined.

While illustrative embodiments have been illustrated and described, it will be appreciated that various changes can be made therein without departing from the spirit and scope of the invention.

Certain embodiments disclosed herein utilize circuitry (e.g., one or more circuits) in order to implement standards, protocols, methodologies or technologies disclosed herein, operably couple two or more components, generate information, process information, analyze information, filter signals, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A shock absorber for a vehicle, comprising:
   a cylinder;
   a piston, a portion of the piston being slidably disposed with the cylinder;
   a sensor fixedly positioned relative to the cylinder; and
   an elongate magnetic target fixedly positioned relative to the piston and extending along the piston in a longitudinal direction, the magnetic target being configured to cause a constant target sensor reading throughout movement of the shock absorber from a partially compressed state to a fully compressed state and back to the partially compressed state.

2. The shock absorber of claim 1, wherein the magnetic target comprises magnetic plating applied to at least a portion of the piston.

3. The shock absorber of claim 1, wherein the magnetic target comprises a magnetic portion of the piston.

* * * * *